(12) United States Patent
Billman et al.

(10) Patent No.: US 12,321,182 B2
(45) Date of Patent: *Jun. 3, 2025

(54) COOKTOP APPLIANCE WITH VARIABLE CLOSED-LOOP CONTROLS

(71) Applicant: Haier US Appliance Solutions, Inc., Wilmington, DE (US)

(72) Inventors: David William Billman, Louisville, KY (US); Catherine Berghuis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 858 days.

This patent is subject to a terminal disclaimer.

(21) Appl. No.: 17/524,783

(22) Filed: Nov. 12, 2021

(65) Prior Publication Data

US 2023/0152824 A1 May 18, 2023

(51) Int. Cl.
*G05D 23/19* (2006.01)
*F23N 1/00* (2006.01)
(Continued)

(52) U.S. Cl.
CPC ......... *G05D 23/1902* (2013.01); *F23N 1/002* (2013.01); *F24C 3/126* (2013.01); *F24C 7/087* (2013.01); *F23N 2235/16* (2020.01)

(58) Field of Classification Search
CPC ...... A47J 27/004; A47J 36/165; A47J 43/046; A47J 27/002; A47J 43/044; A47J 43/082; A47J 27/00; A47J 43/0727; A47J 2043/04454; A47J 27/14; A47J 36/06; A47J 36/2483; A47J 36/26; A47J 36/32; A47J 36/34; A47J 37/047; A47J 43/042; A47J 43/06; A47J 43/0716; A47J 43/087; A47J 44/00; A47J 2043/04463; A47J 31/60; A47J 36/321; A47J 37/105; A47J 43/04; A47J 43/0766; A47J 43/0772; A47J 43/0777; A47J 43/08; A47J 43/085; A47J 36/00; A47J 2027/043; A47J 43/0722; A47J 42/04; A47J 42/46; A47J 42/14; A47J 42/40; A47J 42/00; A47J 42/50; A47F 1/035;
(Continued)

(56) References Cited

U.S. PATENT DOCUMENTS 10,278,238 B2 4/2019 Meng
10,874,244 B2 12/2020 Vengroff
(Continued)

FOREIGN PATENT DOCUMENTS

CN 111006252 A 4/2020
CN 112327715 A 2/2021

*Primary Examiner* — Phuong T Nguyen
(74) *Attorney, Agent, or Firm* — Dority & Manning, P.A.

(57) ABSTRACT

A method of operating a cooktop appliance in a precision mode includes determining a starting temperature and a set of parameters of a closed-loop algorithm for operation of a heating element corresponding to the starting temperature. The method also includes inputting a user-determined set temperature and a current temperature measurement into the closed-loop control algorithm and determining an output of the closed-loop control algorithm using the set of parameters corresponding to the starting temperature. Operation of the heating element is adjusted according to the output of the closed-loop control algorithm.

18 Claims, 4 Drawing Sheets

(51) Int. Cl.
*F24C 3/12* (2006.01)
*F24C 7/08* (2006.01)

(58) Field of Classification Search
CPC ...... F23N 1/002; F23N 2235/16; F24C 3/126; F24C 7/087; G05D 23/1902; H05B 6/062; H05B 6/065; H05B 6/06; H05B 6/067; H05B 6/08; H05B 6/10
USPC ..... 219/621, 620, 627, 625, 448.12; 99/325, 99/326, 331, 337, 338, 342, 352, 357, 99/427, 523, 468, 486, 280, 356, 390, 99/494, 516, 492, 509–511
See application file for complete search history.

(56) References Cited

U.S. PATENT DOCUMENTS

| | | | | |
|---|---|---|---|---|
| 2017/0339751 | A1* | 11/2017 | Meng | G01K 1/143 |
| 2018/0070756 | A1* | 3/2018 | Vengroff | A47J 36/321 |
| 2020/0408413 | A1 | 12/2020 | Billman | |

* cited by examiner

COOKTOP APPLIANCE WITH VARIABLE CLOSED-LOOP CONTROLS

FIELD OF THE INVENTION

The present subject matter relates generally to cooktop appliances, including cooktop appliances configured for precise temperature control.

BACKGROUND OF THE INVENTION

Cooktop appliances generally include heating elements for heating cooking utensils, such as pots, pans and griddles. A user can select a desired heating level, and operation of one or more of the heating elements is modified to match the desired heating level. For example, certain cooktop appliances include electric heating elements. During operation, the cooktop appliance operates the electric heating elements at a predetermined power output corresponding to a selected heating level. As another example, some cooktop appliances include gas burners as heating elements. During operation, the heat output of the gas burner is modulated by adjusting a position of a control valve coupled to the gas burner.

Some cooktop appliances are operable in a precision mode, which generally uses a closed-loop control algorithm to vary the output of the heating element in response to the desired heating level and a measured temperature, e.g., of or at the cooking utensil. Typical closed-loop control algorithms are generally based on certain assumptions, e.g., that the starting temperature of the heating element and/or cooking utensil will be approximately room temperature. In cases were these assumptions are not correct, the typical closed-loop algorithm may not produce the desired results.

Accordingly, a cooktop appliance with features for improved precision temperature control, e.g., that is more responsive to actual conditions and less reliant on fixed assumptions, would be useful.

BRIEF DESCRIPTION OF THE INVENTION

Aspects and advantages of the invention will be set forth in part in the following description, or may be apparent from the description, or may be learned through practice of the invention.

In one example embodiment, a cooktop appliance includes a user interface. The cooktop appliance also includes a heating element positioned at a cooking surface of the cooktop appliance and a temperature sensor configured to measure a temperature at a utensil heated by the heating element. The cooktop appliance further includes a controller. The controller is configured for receiving a user-determined set temperature from the user interface, receiving a precision mode initiation signal, and receiving a temperature measurement from the temperature sensor. The controller is also configured for determining a starting temperature. The controller is further configured for determining a set of parameters of a closed-loop algorithm for operation of the heating element corresponding to the starting temperature. The controller is also configured for inputting the user-determined set temperature and a current temperature measurement into the closed-loop control algorithm and for determining an output of the closed-loop control algorithm using the set of parameters corresponding to the starting temperature. The controller is further configured for adjusting operation of the heating element according to the output of the closed-loop control algorithm. The closed-loop algorithm includes comparing the current temperature measurement to the user-determined set temperature and generating the output of the closed-loop algorithm based on the comparison of the current temperature measurement to the user-determined set temperature using the set of parameters of the closed-loop algorithm corresponding to the starting temperature.

In another example embodiment, a method of operating a cooktop appliance is provided. The method includes receiving a user-determined set temperature from a user interface of the cooktop appliance, receiving a precision mode initiation signal, and receiving a temperature measurement from a temperature sensor configured to measure a temperature at a utensil heated by a heating element positioned at a cooking surface of the cooktop appliance. The method also includes determining a starting temperature. The method further includes determining a set of parameters of a closed-loop algorithm for operation of the heating element corresponding to the starting temperature. The method also includes inputting the user-determined set temperature and a current temperature measurement into the closed-loop control algorithm and determining an output of the closed-loop control algorithm using the set of parameters corresponding to the starting temperature. The method also includes adjusting operation of the heating element according to the output of the closed-loop control algorithm. The closed-loop algorithm includes comparing the current temperature measurement to the user-determined set temperature and generating the output of the closed-loop algorithm based on the comparison of the current temperature measurement to the user-determined set temperature using the set of parameters of the closed-loop algorithm corresponding to the starting temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
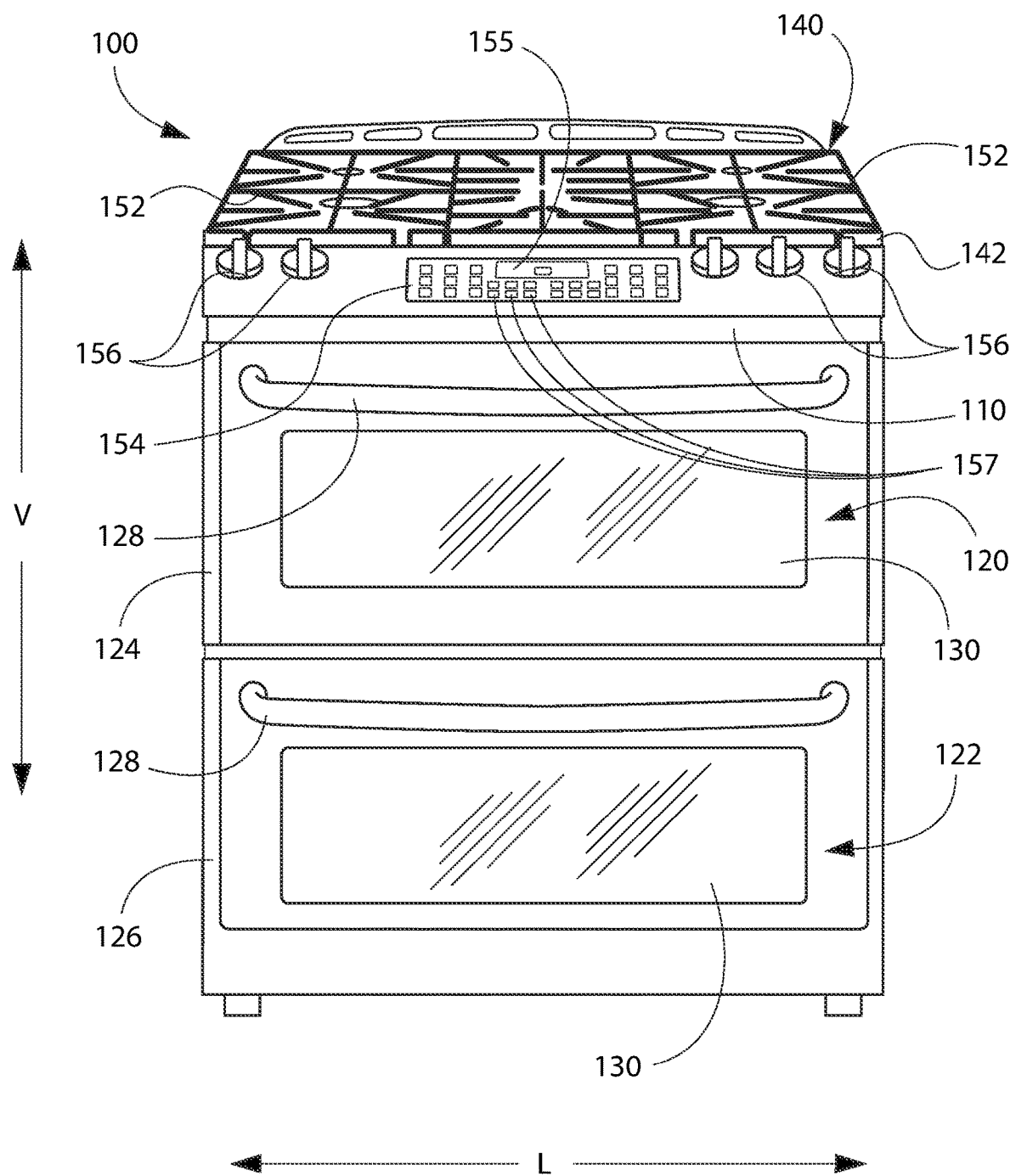
FIG. 1 provides a front, perspective view of a range appliance having a cooktop according to one or more example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
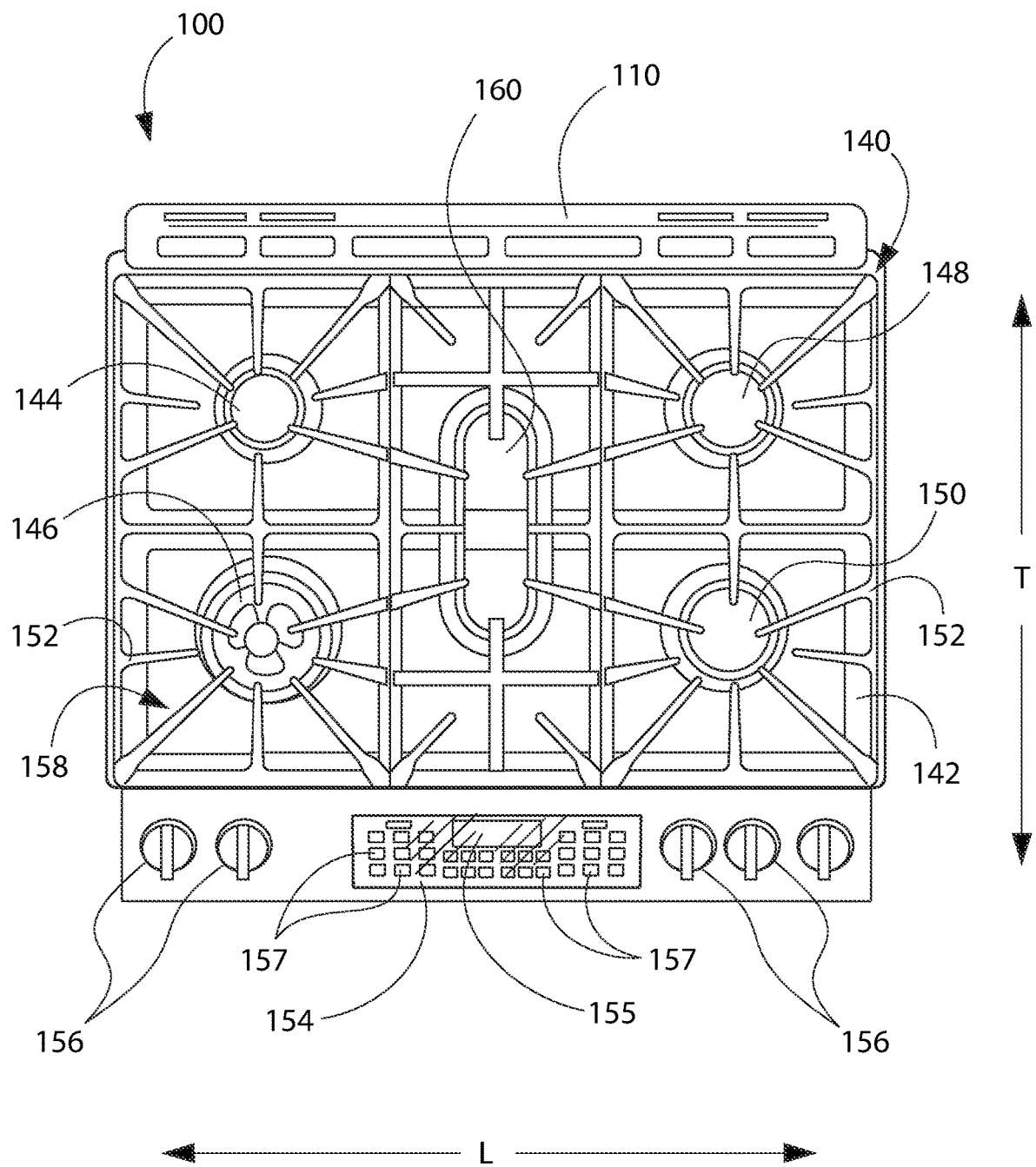
FIG. 2 provides a top, plan view of the example appliance of FIG. 1.

FIG. 1 provides a front, perspective view of a cooktop appliance 100 as may be employed with the present subject matter. FIG. 2 provides a top, plan view of cooktop appliance 100. As illustrated in FIGS. 1 and 2, the example cooktop appliance 100 includes an insulated cabinet 110. Cabinet 110 defines an upper cooking chamber 120 and a lower cooking chamber 122. Thus, this particular exemplary cooktop appliance 100 is generally referred to as a double oven range appliance. As will be understood by those skilled in the art, range appliance 100 is provided by way of example only, and the present subject matter may be used in any suitable cooktop appliance, e.g., a single oven range appliance or a standalone cooktop appliance. In other exemplary embodiments of the present disclosure, the cooktop appliance may include a single cooking chamber, or no cooking chamber at all, such as a standalone cooktop appliance, e.g., which may be built in to a countertop. Thus, the example embodiment shown in FIG. 1 is not intended to limit the present subject matter to any particular cooking chamber configuration or arrangement (or even the presence of a cooking chamber at all, e.g., as in the case of a standalone cooktop appliance).

Upper and lower cooking chambers 120 and 122 are configured for the receipt of one or more food items to be cooked. Cooktop appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass window panes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Cooktop appliance 100 also includes a cooktop 140. Cooktop 140 is positioned at or adjacent to a top portion of cabinet 110. Thus, cooktop 140 is positioned above upper and lower cooking chambers 120 and 122. Cooktop 140 includes a top panel 142. By way of example, top panel 142 may be constructed of glass, ceramics, enameled steel, and combinations thereof.

For cooktop appliance 100, a utensil 18 (see, e.g., FIGS. 3 and 4) holding food and/or cooking liquids (e.g., oil, water, etc.) may be placed onto grates 152 at a location of any of burner assemblies 144, 146, 148, 150. Burner assemblies 144, 146, 148, 150 provide thermal energy to cooking utensils on grates 152. As shown in FIG. 2, burner assemblies 144, 146, 148, 150 can be configured in various sizes so as to provide e.g., for the receipt of cooking utensils (i.e., pots, pans, etc.) of various sizes and configurations and to provide different heat inputs for such cooking utensils. Grates 152 are supported on a cooking surface, e.g., top surface 158 of top panel 142. Range appliance 100 also includes a griddle burner 160 positioned at a middle portion of top panel 142, as may be seen in FIG. 2. A griddle may be positioned on grates 152 and heated with griddle burner 160.

A user interface panel 154 is located within convenient reach of a user of the range appliance 100. For this example embodiment, range appliance 100 also includes knobs 156 that are each associated with one of burner assemblies 144, 146, 148, 150 and griddle burner 160. Knobs 156 allow the user to activate each burner assembly and determine the amount of heat input provided by each burner assembly 144, 146, 148, 150 and griddle burner 160 to a cooking utensil located thereon. The user interface panel 154 may also include one or more inputs 157, such as buttons or a touch pad, for selecting or adjusting operation of the range appliance 100, such as for selecting or initiating a precision cooking mode, as will be described in more detail below. User interface panel 154 may also be provided with one or more graphical display devices 155 that deliver certain information to the user such as e.g., whether a particular burner assembly is activated and/or the temperature at which the burner assembly is set.

Although shown with knobs 156, it should be understood that knobs 156 and the configuration of range appliance 100 shown in FIG. 1 is provided by way of example only. More specifically, range appliance 100 may include various input components, such as one or more of a variety of touch-type controls, electrical, mechanical or electro-mechanical input devices including rotary dials, push buttons, and touch pads. The user interface panel 154 may include other display components, such as a digital or analog display device 155, designed to provide operational feedback to a user.

As will be discussed in greater detail below, the cooktop appliance 100 includes a control system 50 (FIG. 4) for controlling one or more of the plurality of heating elements 16. Specifically, the control system 50 may include a controller 52 (FIGS. 3 and 4) operably connected to the user interface panel 154 and controls, e.g., knobs 156. The controller 52 may be operably connected to each of the plurality of heating elements 16 for controlling a power supply and/or flow of gaseous fuel to each of the plurality of heating elements 16 in response to one or more user inputs received through the interface panel 154 and controls.

Figure 3:
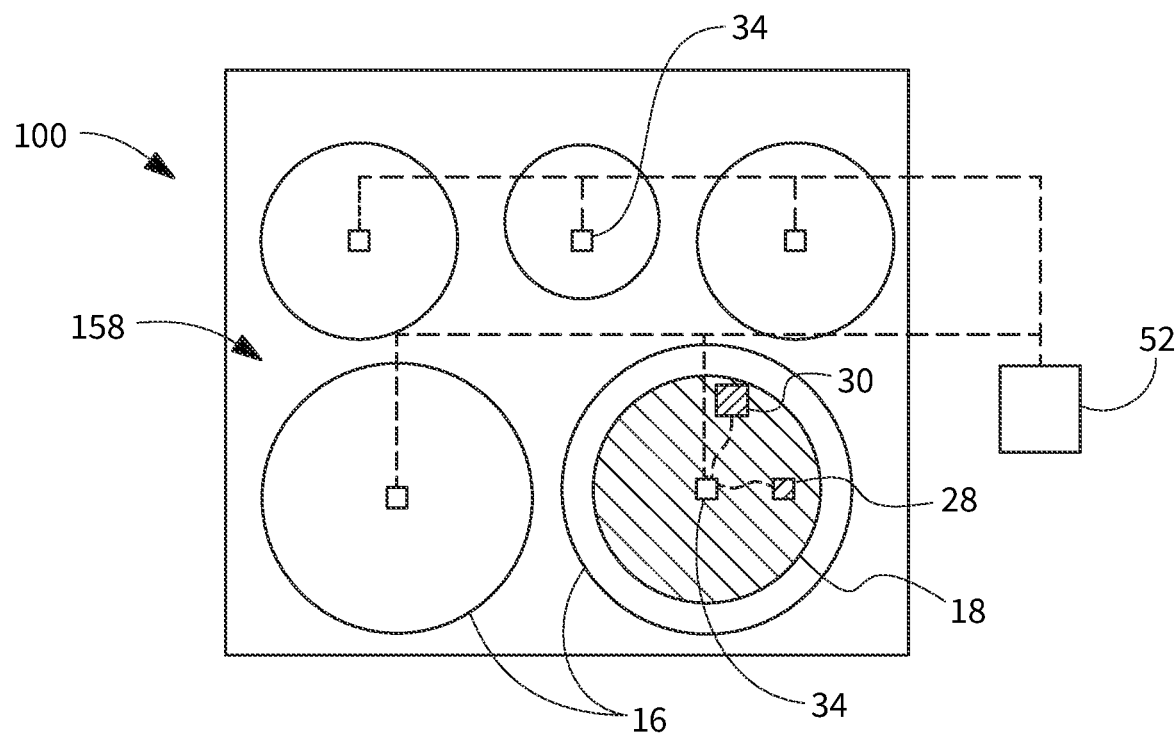
FIG. 3 is a schematic top view of an exemplary cooktop according to one or more example embodiments of the present subject matter which may be incorporated into a range appliance such as the range appliance of FIG. 1.

FIG. 3 is a schematic view of certain components of cooktop appliance 100. In particular, as shown in FIG. 3, cooktop appliance 100 includes a plurality of heating elements 16, which may be gas burners, e.g., as in the exemplary embodiments illustrated in FIGS. 1 and 2 and described above, or may be electric heating elements, such as induction heating elements or resistance heating elements.

Referring now to FIG. 3, a top, schematic view of a cooktop, which may be, e.g., the cooktop 140 of FIG. 1, is provided. As stated, the cooking surface 158 of the cooktop 140 for the embodiment depicted includes five heating elements 16 spaced along the cooking surface 158. The heating elements 16 may be gas burners, e.g., as illustrated in FIGS. 1 and 2, or may be electric heating elements such as resistance heating elements or induction heating elements, etc. A cooking utensil 18, also depicted schematically, is positioned on a first heating element 16 of the plurality of heating elements 16. For the embodiment depicted, a cookware temperature sensor 28 and a food temperature sensor 30 are also associated with the cooking utensil 18.

In some example embodiments, the cookware temperature sensor 28 may be in contact with, attached to, or integrated into the cooking utensil 18 and configured to sense a temperature of, e.g., a bottom surface of the cooking utensil 18 or bottom wall of the cooking utensil 18. For example, the cookware temperature sensor 28 may be embedded within the bottom wall of the cooking utensil 18 as illustrated in FIG. 3. Alternatively, however, the cookware temperature sensor 28 may be attached to or integrated within the cooking surface 14 of the cooktop appliance 12. For example, the cookware temperature sensor 28 may be integrated into one or more of the heating elements 16. With such an exemplary embodiment, the cookware temperature sensor 28 may be configured to physically contact the bottom surface of a bottom wall of the cooking utensil 18 when the cooking utensil 18 is placed on the heating element 16 into which the temperature sensor 28 is integrated. Alternatively, cookware temperature sensor 28 may be positioned proximate to the bottom surface or bottom wall of the cooking utensil 18 when the cooking utensil 18 is placed on the heating element 16.

Additionally, the food temperature sensor 30 may be positioned at any suitable location to sense a temperature of one or more food items 32 (see FIG. 4) positioned within the cooking utensil 18. For example, the food temperature sensor 30 may be a probe type temperature sensor configured to be inserted into one or more food items 32. Alternatively, however, the food temperature sensor 30 may be configured to determine a temperature of one or more food items positioned within the cooking utensil 18 in any other suitable manner.

In certain exemplary embodiments, one or both of the cookware temperature sensor 28 and the food temperature sensor 30 may utilize any suitable technology for sensing/determining a temperature of the cooking utensil 18 and/or food items 32 positioned in the cooking utensil 18. The cookware temperature sensor 28 and the food temperature sensor 30 may measure a respective temperature by contact and/or non-contact methods. For example, one or both of the cookware temperature sensor 28 and the food temperature sensor 30 may utilize one or more thermocouples, thermistors, optical temperature sensors, infrared temperature sensors, resistance temperature detectors (RTD), etc.

Referring again to FIGS. 3 and 4, the cooktop appliance 100 additionally includes at least one receiver 34. In the illustrated example of FIG. 3, the cooktop appliance 100 includes a plurality of receivers 34, each receiver 34 associated with an individual heating element 16. Each receiver 34 is configured to receive a signal from the food temperature sensor 30 indicative of a temperature of the one or more food items 32 positioned within the cooking utensil 18 and/or from the cookware temperature sensor 28 indicative of a temperature of the cooking utensil 18 positioned on a respective heating element 16. In other embodiments, a single receiver 34 may be provided and the single receiver 34 may be operatively connected to one or more of the sensors. In at least some exemplary embodiments, one or both of the cookware temperature sensor 28 and the food temperature sensor 30 may include wireless transmitting capabilities, or alternatively may be hard-wired to the receiver 34, e.g., through a wired communications bus.

Figure 4:
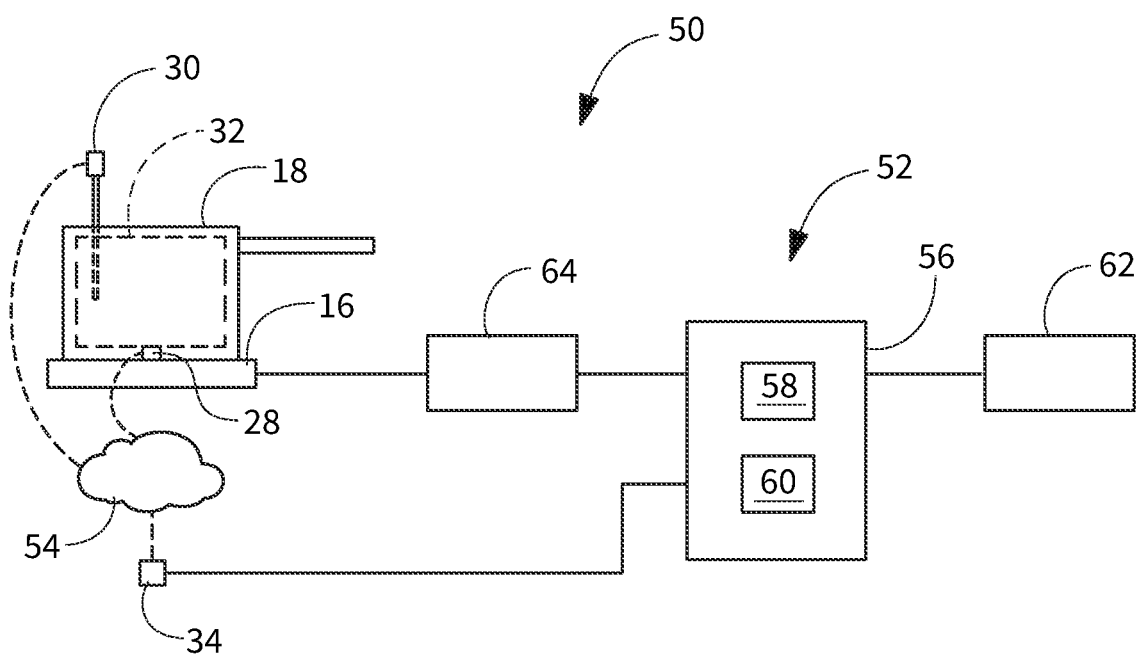
FIG. 4 provides a schematic diagram of a control system as may be used with the exemplary cooktop appliance of FIG. 3.

FIG. 4 provides a schematic view of a system for operating a cooktop appliance 100 in accordance with an exemplary embodiment of the present disclosure. Specifically, FIG. 4 provides a schematic view of a heating element 16 of the exemplary cooktop appliance 12 of FIGS. 1 and 2 and an exemplary control system 50.

As stated, the cooktop appliance 100 includes a receiver 34 associated with one or more of the heating elements 16, for example a plurality of receivers 34 each associated with a respective heating element 16. For the embodiment depicted, each receiver 34 is positioned directly below a center portion of a respective heating element 16. Moreover, for the embodiment depicted, each receiver 34 is configured as a wireless receiver 34 configured to receive one or more wireless signals. Specifically, for the exemplary control system 50 depicted, both of the cookware temperature sensor 28 and the food temperature sensor 30 are configured as wireless sensors in wireless communication with the wireless receiver 34 via a wireless communications network 54. In certain exemplary embodiments, the wireless communications network 54 may be a wireless sensor network (such as a Bluetooth communication network), a wireless local area network (WLAN), a point-to point communication networks (such as radio frequency identification (RFID) networks, near field communications networks, etc.), a combination of two or more of the above communications networks, or any suitable wireless communications network or networks.

Referring still to FIG. 4, each receiver 34 associated with a respective heating element 16 is operably connected to a controller 52 of the control system 50. The receivers 34 may be operably connected to the controller 52 via a wired communication bus (as shown), or alternatively through a wireless communication network similar to the exemplary wireless communication network 54 discussed above. The controller 52 may generally include a computing device 56 having one or more processor(s) 58 and associated memory device(s) 60. The computing device 56 may be configured to perform a variety of computer-implemented functions to control the exemplary cooktop appliance 100. The computing device 56 can include a general purpose computer or a special purpose computer, or any other suitable computing device. It should be appreciated, that as used herein, the processor 58 may refer to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory 60 can store information accessible by processor(s) 58, including instructions that can be executed by processor(s) 58. For example, the instructions can be software or any set of instructions that when executed by the processor(s) 58, cause the processor(s) 58 to perform operations. For the embodiment depicted, the instructions may include a software package configured to operate the system to, e.g., execute the exemplary methods described below.

Referring again to FIG. 4, the control system 50 additionally includes a user interface 62 operably connected to the controller 52. For the embodiment depicted, e.g., in FIG. 4, the user interface 62 is configured in wired communication with the controller 52. However, in other exemplary embodiments, the user interface 62 may additionally or alternatively be wirelessly connected to the controller 52 via one or more suitable wireless communication networks (such as the exemplary wireless communication network 54 described above). In certain exemplary embodiments, user interface 62 may be configured as the user interface panel 154 and plurality of controls, e.g., knobs 156, on the cooktop appliance 100 (see, e.g., FIG. 1). Additionally, or alternatively, the user interface 62 may be configured as an external computing device or remote user interface device, such as a smart phone, tablet, or other device capable of connecting to the controller 52 of the exemplary control system 50. For example, in some embodiments, the remote user interface may be an application or "app" executed by a remote user interface device such as a smart phone or tablet. Signals generated in controller 52 operate the cooktop appliance 100 in response to user input via the user interface 62.

Further, the controller 52 is operably connected to each of the plurality of heating elements 16 for controlling an operating level, such as a supply of power or a flow of fuel, to each of the plurality of heating elements 16 in response to one or more user inputs through the user interface 62 (e.g., user interface panel 154 and/or controls, e.g., knobs 156). For example, the controller 52 may be operably connected to each of the plurality of heating elements 16 via a plurality of control devices 64, e.g., the controller 52 may be operably connected to the plurality of control devices 64, and each control device 64 may be associated with a respective one of the heating elements 16. In embodiments wherein one or more of the heating elements 16 are configured as electric resistance heaters, the controller 52 may be operably connected to respective relays, triodes for alternating current, or other devices for controlling an amount of power supplied to such electrical resistance heaters, each of which is an exemplary embodiment of control devices 64. Alternatively, in embodiments where one or more of the heating elements 16 are configured as induction heating elements, the controller 52 may be operably connected to respective current control devices, e.g., the control devices 64 operably connected to controller 52 may be respective current control devices for each induction heating element. As another example, in embodiments wherein one or more of the heating elements 16 are configured as gas burners, the control devices 64 may include one or more gas supply valves fluidly coupled to each gas burner for selectively adjusting or restricting, e.g., cutting off, a flow of fuel to each gas burner from a fuel supply.

According to various embodiments of the present disclosure, the cooktop appliance 100 may be configured for a precision cooking mode and/or methods of operating the cooktop appliance 100 may include precision cooking mode. Precision cooking mode generally includes a closed-loop control algorithm used to automatically (e.g., without user input such as adjusting the knobs 156) adjust the heating levels of one or more of the heating elements 16. Utilizing temperature measurements from one or both of the temperature sensors 28 and 30, controller 52 may adjust the control device(s) 64 associated with the heating element 16 currently in use. For example, the user may turn on the closed loop control system by initiating precision cooking mode, such as by pressing or otherwise manipulating a corresponding one of the inputs or controls of the user interface 62. Such inputs and/or controls of the user interface 62 may also be used to input a user-defined set temperature or target temperature for the cooking operation.

When the closed loop control system is activated, controller 52 receives the temperature measurements from temperature sensor 28 and/or 30 and compares the temperature measurements to a target temperature, e.g., the user-defined set temperature. In order to reduce a difference between the temperature measurements from the temperature sensor 28 and/or 30 and the set temperature, controller 52 adjusts the respective control device 64. Thus, the heat output provided by the heating element 16 may be regulated by the closed loop control system, e.g., without additional user input and/or monitoring.

A user may establish the set temperature via the user interface 62, e.g., the user interface may include knobs 156, inputs 157, and a display 155, as in the illustrated example embodiment of FIG. 2. Controller 52 is in communication with user interface 62 and is configured to receive the user-determined set temperature from user interface 62. User interface 62 may correspond to user interface panel 154 and/or controls, e.g., knobs 156, in certain example embodiments. Thus, the user may, for example, utilize keys 157 on user interface panel 154 and/or a rotary position of one of the knobs 156 to establish the set temperature. In such example embodiments, user interface 62 is positioned on top panel 142 and may be in communication with controller 52 via a wiring harness. As another example, user interface 62 may also or instead correspond to an application on a smartphone or other device, and the user may utilize the application to establish the set temperature. In such example embodiments, user interface 62 may be in wireless communication with controller 52, e.g., via a Bluetooth® or Wi-Fi® connection.

Figure 5:
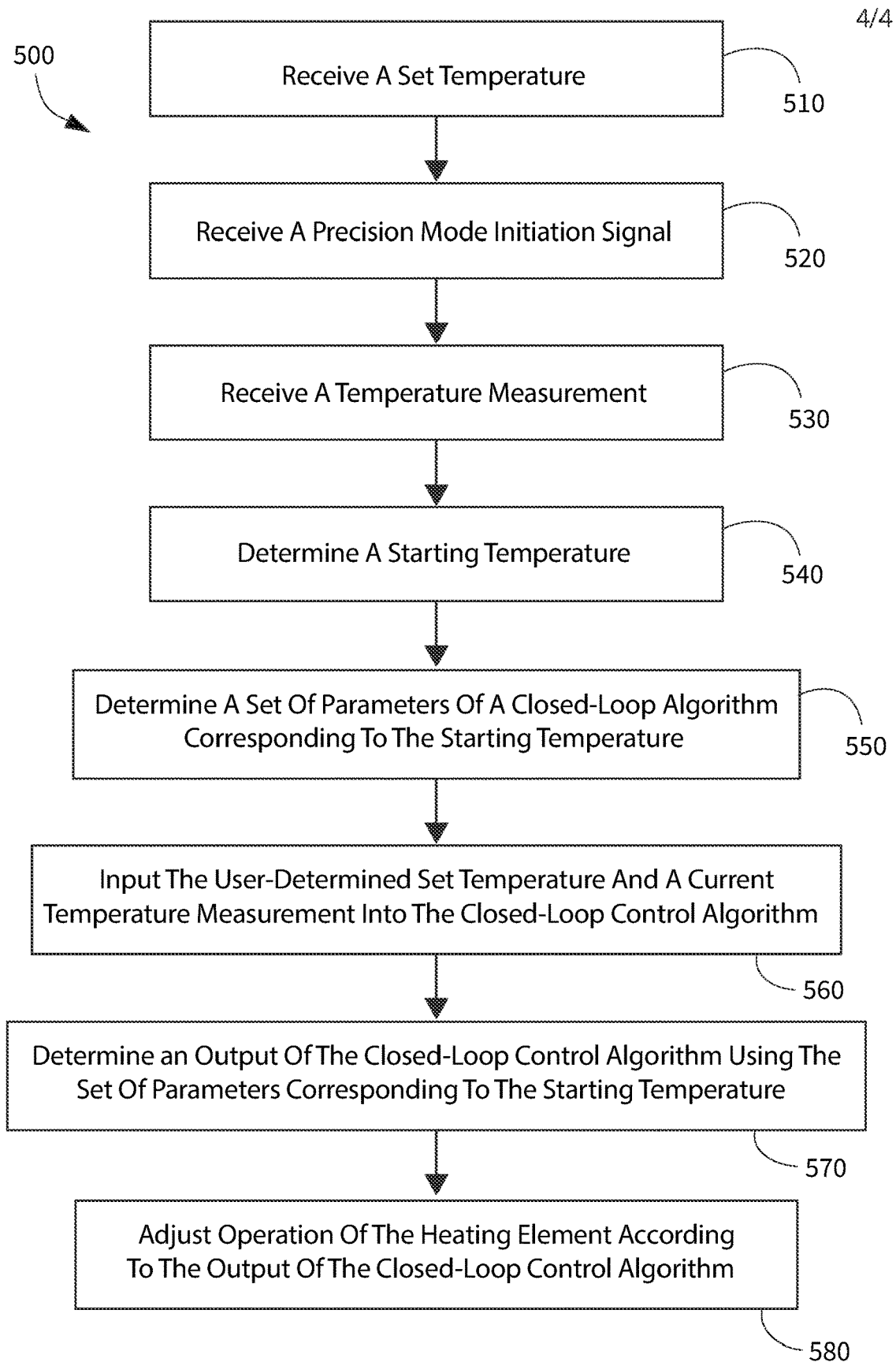
FIG. 5 provides a flow chart illustrating an exemplary method of operating a cooktop appliance according to one or more example embodiments of the present subject matter.

Turning now to FIG. 5, an example method 500 of operating a cooktop appliance, such as the example appliance 100 described above, is illustrated. The method 500 may include a step 510 of receiving a user-determined set temperature from a user interface, e.g., user interface 62, of the cooktop appliance. The method 500 may also include a step 520 of receiving a precision mode initiation signal. The precision mode initiation signal may be received from the user interface, e.g., user interface panel 154 and/or knobs 156. The precision mode initiation signal may represent or correspond to a user request for precision cooking mode based on a user pressing a precision cooking mode key or button 157 or otherwise entering the request via the user interface 62. It will be understood that the precision cooking mode includes a target temperature, e.g., the user-determined set temperature received from the user interface at step 510.

The precision cooking mode utilizes a closed-loop control system, which may operate or adjust the cooktop appliance based on input from a temperature sensor. Thus, exemplary embodiments of the method 500 may also include a step 530 of receiving a temperature measurement from the temperature sensor. Step 530 may be performed after step 520 of receiving the precision mode initiation signal, such as immediately after receiving the precision mode initiation signal and/or before activating or adjusting the heating element in the precision cooking operation. Accordingly, the temperature measurement received at step 530, such as at the beginning of step 530 or a first iteration of step 530, may be or include a starting temperature. As illustrated in FIG. 5, the method 500 may also include a step 540 of determining the starting temperature. Step 530 may also be continuous or repeated, e.g., additional then-current temperature measurements may be received after the starting temperature (as described further below), where the starting temperature will generally correspond to the first or initial temperature measurement received after step 520 of receiving the precision mode initiation signal (such as immediately thereafter).

After determining the starting temperature at step 540, the method 500 may include determining, at step 550, a set of parameters of a closed-loop algorithm for operation of the heating element, where the set of parameters correspond to the starting temperature. For example, the method 500 may generally include determining whether the starting temperature is an ambient temperature or an elevated temperature. For example, the ambient temperature may be generally within an expected room temperature range, such as between about 60° Fahrenheit and about 80° Fahrenheit. The elevated temperature may be a temperature greater than ambient temperature, e.g., above the expected room temperature range, such as about 80° F. or higher, such as about 100° F. or higher, etc. When the starting temperature is generally within the ambient temperature range, the method 500 may initiate the precision cooking mode with predetermined default parameters, e.g., default PID gains in embodiments where the closed-loop control algorithm is a PID (proportional-integral-derivative) algorithm. When the starting temperature is elevated, e.g., greater than ambient as discussed above, the method 500 may initiate precision mode with modified parameters based on the starting temperature. Thus, method 500 may include determining the set of parameters of the closed-loop algorithm corresponding to the starting temperature, e.g., selecting the default parameters when starting at ambient temperature or selecting modified parameters when starting at an elevated temperature.

Determining the set of parameters corresponding to the starting temperature may include selecting a set of parameters from a group of sets of parameters, such as a first, second, and/or third set of parameters each corresponding to a different starting temperature or range of starting temperatures. In some embodiments, the modified parameters may be stored in lookup table, with multiple sets of parameters corresponding to various starting temperatures, such as a first set of modified parameters corresponding to ambient starting temperature, a second set of parameters corresponding to a starting temperature greater than ambient but less than a first threshold, a third set of parameters corresponding to a starting temperature greater than the first threshold but less than a second threshold, a fourth set of parameters corresponding to a starting temperature greater than the second threshold, etc.

As illustrated in FIG. 5, the method 500 may further include a step 560 of inputting the user-determined set temperature and a current temperature measurement into the closed-loop control algorithm. The current temperature measurement may be measured with the same temperature sensor as the starting temperature. For example, the current temperature measurement may be measured with one or both of the temperature sensors 28 and 30 described above, or one or more other suitable temperature sensor(s). Additionally, the current temperature measurement may be iterated or repeated and the closed-loop algorithm updated accordingly (such as inputting the iterated or repeated then-current temperature measurements into the algorithm and generating additional outputs from the algorithm, as described below) throughout the precision cooking mode operation.

Further, method 500 may then include a step 570 of determining an output of the closed-loop control algorithm using the set of parameters corresponding to the starting temperature and a step 580 of adjusting operation of the heating element according to the output of the closed-loop control algorithm. Thus, those of ordinary skill in the art will recognize that the precision cooking mode generally includes automated operation of the heating element according to the closed-loop control based on the set temperature and temperature feedback, e.g., multiple temperature measurements each of which reflects a then-current temperature, over time throughout the precision cooking mode operation.

Further, those of ordinary skill in the art will understand that such closed-loop control generally includes comparing the current temperature measurement to the user-determined set temperature and generating the output of the closed-loop algorithm based on the comparison of the current temperature measurement to the user-determined set temperature using the set of parameters of the closed-loop algorithm corresponding to the starting temperature. Such comparing and output-generating steps may be repeated, e.g., continuously, and the heating level of the heating element adjusted accordingly, throughout the precision cooking mode operation.

In some embodiments, the closed-loop control algorithm may be a proportional-integral-derivative (PID) control loop. In such embodiments, the determined set of parameters corresponding to the starting temperature may be PID gains corresponding to the starting temperature.

In some embodiments, determining the set of parameters corresponding to the starting temperature may include selecting from a group comprising a first set of parameters corresponding to a first starting temperature and a second set of parameters corresponding to a second starting temperature greater than the first starting temperature. For example, the various sets of parameters may be listed or stored in a table, such as a lookup table. Thus, examples of such embodiments may include determining the set of parameters corresponding to the starting temperature by selecting the set of parameters corresponding to the starting temperature from a lookup table, e.g., based on whether the starting temperature is closer to the first starting temperature in the lookup table or the second starting temperature in the lookup table (it also being understood that the lookup table may contain further, e.g., third, fourth, etc., sets of parameters corresponding to additional, e.g., third, fourth, etc., starting temperatures, and the set of parameters may be selected based on which of the starting temperatures in the lookup table the starting temperature is closest to.

In some embodiments, determining the set of parameters corresponding to the starting temperature may include comparing the starting temperature to a temperature threshold, selecting a first set of parameters when the starting temperature is less than or equal to the temperature threshold, and selecting a second set of parameters when the starting temperature is greater than the temperature threshold. Further, some embodiments that include such a threshold may also include multiple thresholds. Thus, in additional exemplary embodiments of the method 500, determining the set of parameters corresponding to the starting temperature may include comparing the starting temperature to a first temperature threshold and a second temperature threshold greater than the first temperature threshold, selecting a first set of parameters when the starting temperature is less than the first temperature threshold, selecting a second set of parameters when the starting temperature is greater than the first temperature threshold and less than the second temperature threshold, and selecting a third set of parameters when the starting temperature is greater than the second temperature threshold.

As mentioned above, the heating elements 16 may be any suitable type of heating element. For example, in some embodiments, the heating element may be or include a gas burner. In such embodiments, adjusting operation of the heating element according to the output of the closed-loop control algorithm may include adjusting a position of a fuel supply valve coupled to the gas burner. As another example, in additional embodiments, the heating element 16 may also or instead be or include an electric heating element. In such embodiments, adjusting operation of the heating element according to the output of the closed-loop control algorithm may include adjusting a level of electric power supplied to the heating element.

As may be seen from the above, the present disclosure provides a precision cooking mode, e.g., a closed-loop control system for operation of a cooktop appliance, which includes increased flexibility of operation, including when the starting temperature is outside of a typically expected range, and cooktop appliances configured to operate according to such methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
   a user interface;
   a heating element positioned at a cooking surface of the cooktop appliance;
   a temperature sensor configured to measure a temperature at a utensil heated by the heating element; and
   a controller, the controller configured for:
      receiving a user-determined set temperature from the user interface;
      receiving a precision mode initiation signal;
      receiving a temperature measurement from the temperature sensor;
      determining a starting temperature;
      determining a set of parameters of a closed-loop algorithm for operation of the heating element corresponding to the starting temperature;
      inputting the user-determined set temperature and a current temperature measurement into the closed-loop control algorithm;
      determining an output of the closed-loop control algorithm using the set of parameters corresponding to the starting temperature; and
      adjusting operation of the heating element according to the output of the closed-loop control algorithm;
      wherein the closed-loop algorithm comprises comparing the current temperature measurement to the user-determined set temperature and generating the output of the closed-loop algorithm based on the comparison of the current temperature measurement to the user-determined set temperature using the set of parameters of the closed-loop algorithm corresponding to the starting temperature.

2. The cooktop appliance of claim 1, wherein the closed-loop control algorithm is a PID control loop.

3. The cooktop appliance of claim 2, wherein the determined set of parameters are PID gains corresponding to the starting temperature.

4. The cooktop appliance of claim 1, wherein determining the set of parameters corresponding to the starting temperature comprises selecting the set of parameters corresponding to the starting temperature from a lookup table.

5. The cooktop appliance of claim 1, wherein determining the set of parameters corresponding to the starting temperature comprises selecting from a group comprising a first set of parameters corresponding to a first starting temperature and a second set of parameters corresponding to a second starting temperature greater than the first starting temperature.

6. The cooktop appliance of claim 1, wherein determining the set of parameters corresponding to the starting temperature comprises comparing the starting temperature to a temperature threshold, selecting a first set of parameters when the starting temperature is less than or equal to the temperature threshold, and selecting a second set of parameters when the starting temperature is greater than the temperature threshold.

7. The cooktop appliance of claim 1, wherein determining the set of parameters corresponding to the starting temperature comprises comparing the starting temperature to a first temperature threshold and a second temperature threshold greater than the first temperature threshold, selecting a first set of parameters when the starting temperature is less than the first temperature threshold, selecting a second set of parameters when the starting temperature is greater than the first temperature threshold and less than the second temperature threshold, and selecting a third set of parameters when the starting temperature is greater than the second temperature threshold.

8. The cooktop appliance of claim 1, wherein the heating element comprises a gas burner, and wherein adjusting operation of the heating element according to the output of the closed-loop control algorithm comprises adjusting a position of a fuel supply valve coupled to the gas burner.

9. The cooktop appliance of claim 1, wherein the heating element comprises an electric heating element, and wherein adjusting operation of the heating element according to the output of the closed-loop control algorithm comprises adjusting a level of electric power supplied to the heating element.

10. A method of operating a cooktop appliance, comprising:
    receiving a user-determined set temperature from a user interface of the cooktop appliance;
    receiving a precision mode initiation signal;
    receiving a temperature measurement from a temperature sensor configured to measure a temperature at a utensil heated by a heating element positioned at a cooking surface of the cooktop appliance;
    determining a starting temperature;
    determining a set of parameters of a closed-loop algorithm for operation of the heating element corresponding to the starting temperature;
    inputting the user-determined set temperature and a current temperature measurement into the closed-loop control algorithm;
    determining an output of the closed-loop control algorithm using the set of parameters corresponding to the starting temperature; and
    adjusting operation of the heating element according to the output of the closed-loop control algorithm;
    wherein the closed-loop algorithm comprises comparing the current temperature measurement to the user-determined set temperature and generating the output of the closed-loop algorithm based on the comparison of the current temperature measurement to the user-determined set temperature using the set of parameters of the closed-loop algorithm corresponding to the starting temperature.

11. The method of claim 10, wherein the closed-loop control algorithm is a PID control loop.

12. The method of claim 11, wherein the determined set of parameters are PID gains corresponding to the starting temperature.

13. The method of claim 10, wherein determining the set of parameters corresponding to the starting temperature comprises selecting the set of parameters corresponding to the starting temperature from a lookup table.

14. The method of claim 10, wherein determining the set of parameters corresponding to the starting temperature comprises selecting from a group comprising a first set of parameters corresponding to a first starting temperature and a second set of parameters corresponding to a second starting temperature greater than the first starting temperature.

15. The method of claim 10, wherein determining the set of parameters corresponding to the starting temperature comprises comparing the starting temperature to a temperature threshold, selecting a first set of parameters when the starting temperature is less than or equal to the temperature threshold, and selecting a second set of parameters when the starting temperature is greater than the temperature threshold.

16. The method of claim 10, wherein determining the set of parameters corresponding to the starting temperature comprises comparing the starting temperature to a first temperature threshold and a second temperature threshold greater than the first temperature threshold, selecting a first set of parameters when the starting temperature is less than the first temperature threshold, selecting a second set of parameters when the starting temperature is greater than the first temperature threshold and less than the second temperature threshold, and selecting a third set of parameters when the starting temperature is greater than the second temperature threshold.

17. The method of claim 10, wherein the heating element comprises a gas burner, and wherein adjusting operation of the heating element according to the output of the closed-loop control algorithm comprises adjusting a position of a fuel supply valve coupled to the gas burner.

18. The method of claim 10, wherein the heating element comprises an electric heating element, and wherein adjusting operation of the heating element according to the output of the closed-loop control algorithm comprises adjusting a level of electric power supplied to the heating element.

* * * * *